(No Model.) 2 Sheets—Sheet 1.
O. A. STEVENS & E. L. DU BARRY.
COMBINED FURNACE AND STACK FOR DESTROYING NOXIOUS OR POISONOUS GASES.
No. 258,498. Patented May 23, 1882.
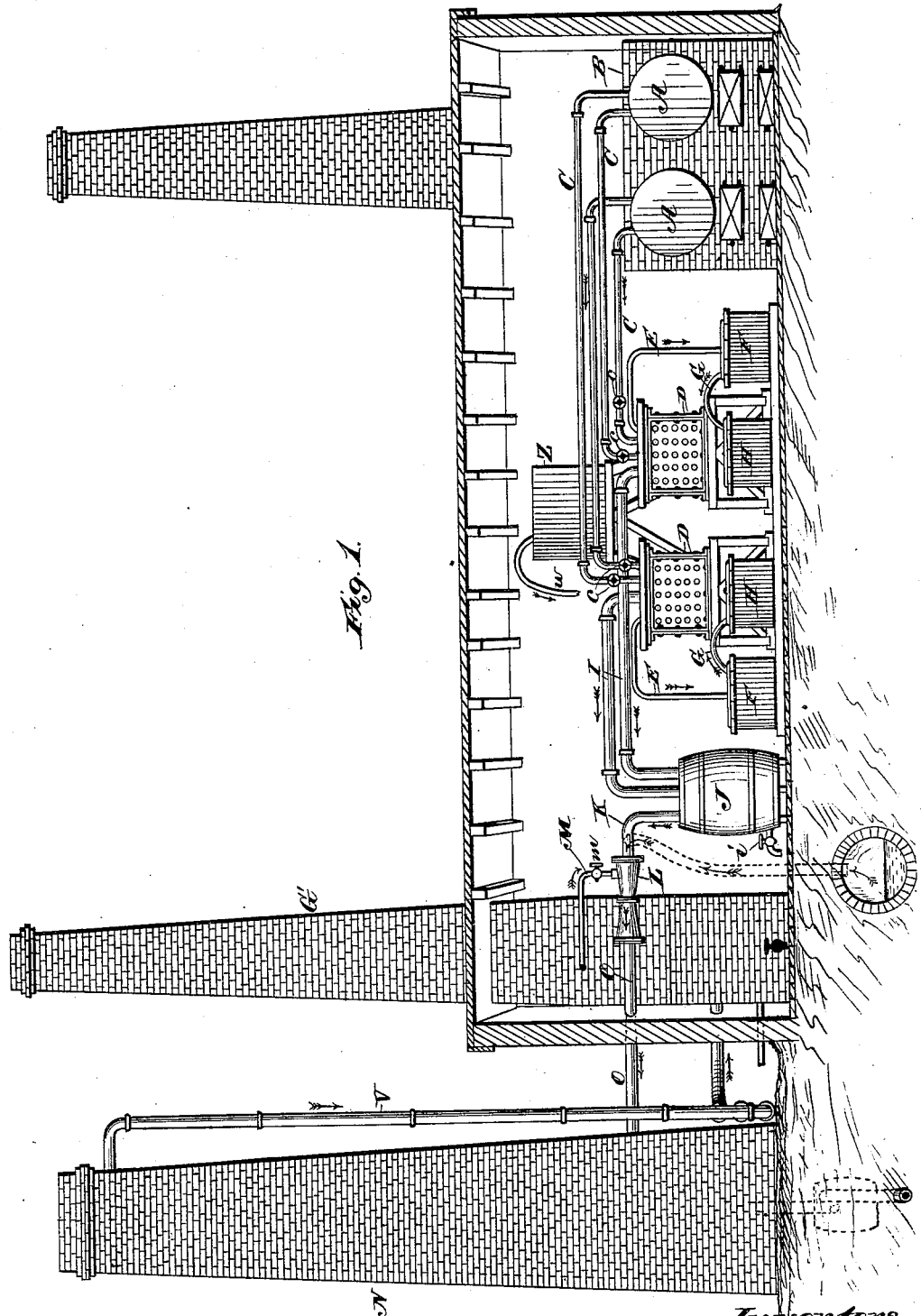
Witnesses.
Robert Everett,
J. A. Rutherford
Inventors.
Oscar A. Stevens,
Edmund L. Du Barry.
By James L. Norris.
Atty.

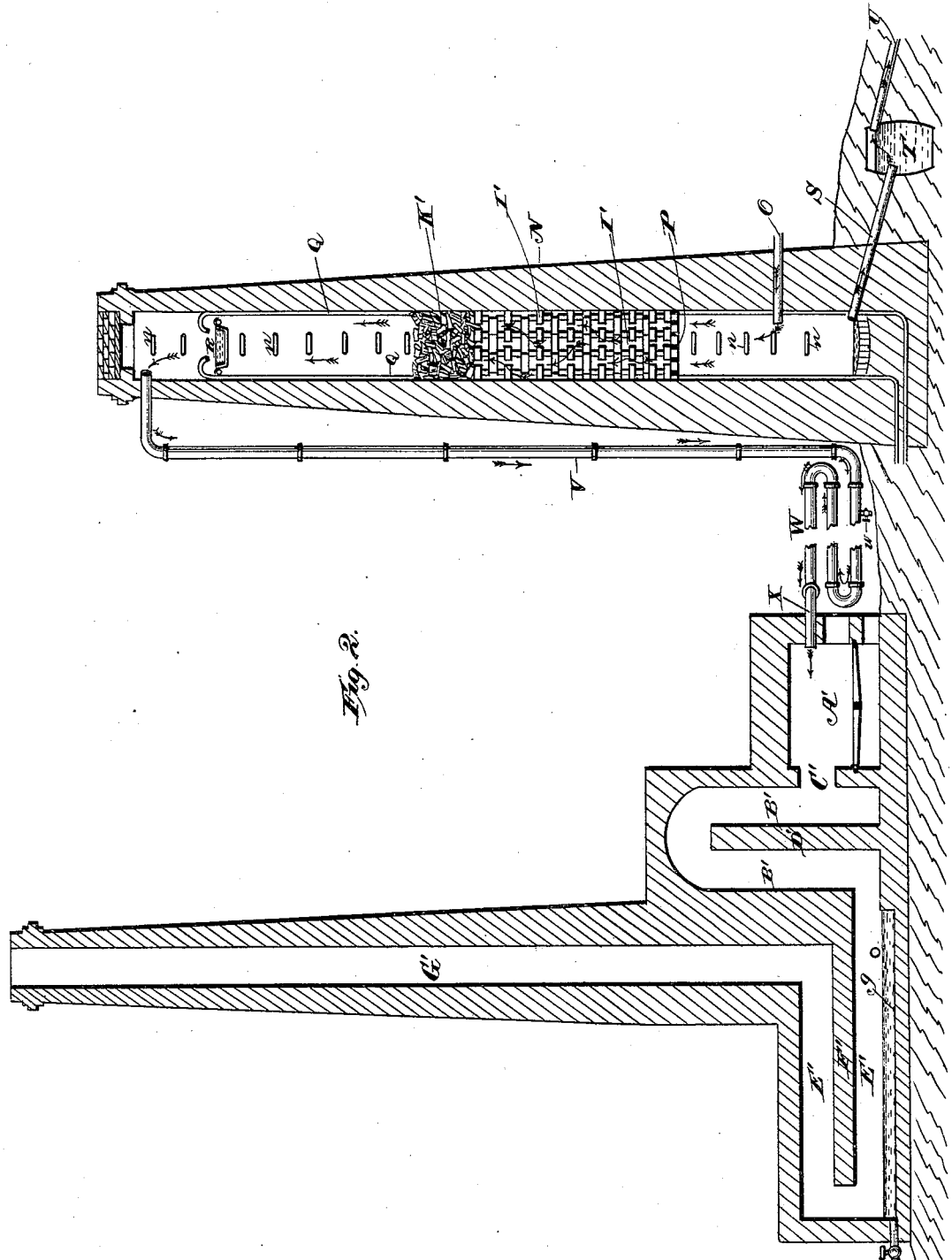

UNITED STATES PATENT OFFICE.

OSCAR A. STEVENS AND EDMUND L. DU BARRY, OF WASHINGTON, D. C.

COMBINED FURNACE AND STACK FOR DESTROYING NOXIOUS OR POISONOUS GASES.

SPECIFICATION forming part of Letters Patent No. 258,498, dated May 23, 1882.

Application filed July 26, 1881. (No model.)

*To all whom it may concern:*

Be it known that we, OSCAR A. STEVENS and EDMUND L. DU BARRY, citizens of the United States, residing at Washington, in the District of Columbia, have invented new and useful Improvements in Combined Furnace and Stack for Destroying Noxious or Poisonous Gases, of which the following is a specification.

This invention relates to an improved method of destroying noxious and deleterious gases and vapors; and it is specially designed to be applied to the destruction of the gases evolved in the separation of ammonia evolved from gas-liquor in the treatment of the same for the separation of ammonia therefrom, and whereby such gases are prevented from escaping and being disseminated in the open air. These objects are attained by the apparatus illustrated in the accompanying drawings, in which—

Figure 1 represents a side elevation of the apparatus entire, showing the same in connection with suitable apparatus for treating the gas-liquor; and Fig. 2, a vertical section of the apparatus for destroying the gases, arranged so as to illustrate a section of the furnace.

The letter A indicates the boilers for the distillation of the gas-liquor. The said boilers are located in the furnace B, and from them extend the pipes C to the saturators D, in which the ammonia vapors are combined with a suitable acid to form ammonia salts or ammonia pickle. The said pipes are provided with stop-cocks c, by means of which communication between the boilers and saturators may be established or cut off. From the saturators extend the siphons E to the settlers F, and from these extend the siphons G, connecting the said settlers with the evaporators H, in which the water is driven off, leaving the ammonia salts substantially in a dry state.

The letter Z indicates an acid-tank, and w a siphon by means of which acid may be supplied to the saturators. From the upper portions of the respective saturators extend the pipes I to a chamber or closed vessel, J, which chamber or vessel is provided with a stop-cock, i, near the bottom, for the purpose of drawing off any liquid that may collect in said vessel.

The letter K indicates a pipe, leading from the chamber J to casing L, which is provided with a jet-tube, M, having a suitable stop-cock, m, and connecting with a suitable steam-boiler. The said casing connects with the vertical hollow tower N by means of a pipe, O, leading into said tower near its base. The tower is provided at its top with a removable iron plate, by means of which it may be temporarily closed, and when thus closed the plate is bricked over, as indicated. The inside of the tower is provided with footholds, by means of which a workman may descend conveniently from the top and remove the terra-cotta and brick-work when they become clogged or otherwise rendered inoperative, and the tower charged anew. To accomplish this the seal at the top of the tower is removed by taking off the brick-work and removing the iron plate, the said plate and brick-work being replaced after the desired changes have been made in the interior of the tower. Above the entrance of the pipe O the tower is provided with a grate, P, and above the grate with a course of openly-arranged brick-work, I, upon the top of which is a course of broken terra-cotta or other similar material, K.

The letter Q indicates two pipes, extending up the inside of the tower and connecting at their lower ends with a suitable water-supply. The said pipes are bent at their upper ends, and terminate directly over a shallow cup or vessel, R, located in the upper part of the tower, and so arranged as to permit the water supplied by the pipes Q to overflow its edges in proper quantities. The said vessel may be perforated, so as to shower the water; or a rose for issuing the water in jets may be substituted for the pan or vessel.

From the lower part of the tower extends a pipe, S, to a buried receptacle, T, from which extends a pipe, U, to a sewer or other drain, the vessel forming a seal or trap, which prevents any possibility of the escape of gas or gases.

The letter V indicates a pipe leading from the top of the tower downward, when it terminates in a series of pipes and return-bends W, having a suitable cock, w. The letter X indicates a pipe leading from the upper one of the said series of pipes to a furnace, A'. The said furnace is provided with the usual grate and openings for fuel and drafts.

The letter B' indicates a circuitous flue at the rear of the furnace, with which the furnace communicates through an opening, C'. The said flue is partly divided vertically by means of a partition, D', so as to form a circuitous path for the flame, securing an intense heat, due to the reverberatory action therein, and connects with a horizontal flue, E', which is partly divided horizontally by means of the partition F'. The said flue connects with the chimney G', through which the products of combustion finally escape.

The letter g indicates a receptacle at the bottom of the horizontal flue, provided with a cock or door through which matter collected therein may be drawn off, the said recess being supplied with a continuous current of water by means of suitable supply and discharge pipes.

The circuitous flues B' and E', by increasing the extent of travel of the products of combustion and the gases to be consumed, insure the thorough destruction of all smoke and gases that may escape unconsumed from the furnace.

The operation of our invention is as follows: The waste liquor from the hydraulic mains is placed in the boilers and distilled, the vapors passing over into the saturator. From thence they pass into the settlers, and finally into the evaporators communicating therewith. While in the saturators they may be subjected to the action of acids supplied from the acid-tanks Z, through the siphon w, connected therewith, and thus form ammoniacal solutions. The incondensible gases and vapors then pass on to the gas-chamber, from which they pass to the injector connecting with the tower, being carried forward by the current of steam injected through the injector. They then pass into the tower, their course through the same being retarded by the courses of brick and layers of terra-cotta or other material, and while passing upward are washed and cooled, being subjected to the action of water overflowing from the edges of the shallow vessel in the upper part of the tower, or showered through the bottom of the same, or otherwise distributed by a rose-jet or other device. By this means all soluble impurities are washed out and carried off with the water at the bottom of the tower. From the tower the gases and vapors pass on to the furnace, where they are subjected to an intense heat in the circuitous flues, and are thoroughly consumed, the flues leading to the chimney, by their extent and the dome-compartment B' of the furnace, holding the smoke and gases with the hot products of combustion, thus insuring their complete destruction.

It is evident that our invention is applicable to all cases where noxious gases are generated and escape in the air, such as the rendering of fats, soap-boiling, sewers, and the like, and hence we do not intend to limit ourselves to its application to ammonia-works.

When the invention is applied to the destruction of sewer-gases, the pipe K is connected directly with the sewer, as shown in dotted lines, Fig. 1, and the injector L will, with the aid of steam, serve to exhaust such gases from the sewer and force them through the furnace; or there may be substituted for the injector a centrifugal blower of any of the well-known forms.

Having thus described my invention, what I claim, and desire to secure by Letters Patent, is—

1. The herein-described method of treating noxious gases by first passing the gases in an upwardly-ascending current over moist retarding-surfaces and upward through a descending spray of water, so as to cool and wash the gases, and then burning them in their washed and cooled condition at an intense heat by forcing them into intimate contact with incandescent or ignited combustible and inflammable substances, substantially as described.

2. In combination with the gas-reservoir, the tower provided with means for retarding the currents of gases and subjecting them to the action of a current of water for the purpose of washing and cooling the same preparatory to burning, and the injector arranged to force a current of steam or air directly into the tower, thereby inducing a current of the gases and forcing the same into and up through the tower and thence to the furnace, substantially as specified.

3. In an apparatus for destroying noxious gases, the tower connecting with the gas receptacle or chamber and with a furnace, the said tower being provided with a course of loosely-arranged bricks and a course of broken terra-cotta or similar material, and with an overflow-vessel and water-pipes, whereby the gas on its upward passage may be thoroughly washed and cooled, substantially as described.

4. In combination with the tower and furnace and the connecting-pipes, the series of pipes and return-bends, provided with a suitable cock, whereby any condensed vapor carried over may be collected, substantially as described.

5. In combination with the tower, the herein-described furnace, connected therewith by means of a suitable pipe, whereby the washed and cooled gases and vapors are subjected to the action of intense heat and destroyed, substantially as specified.

6. In combination with the furnace and its vertical flue, the horizontal flue, and the receptacle at the bottom of said flue for holding water, whereby the solid products of combustion arising from the burning gases and fuel are arrested and prevented from escaping into the atmosphere, substantially as specified.

7. The combination, in an apparatus for destroying noxious gases, of the gas-chamber and connections, the tower provided with devices for retarding the gas and for washing and cooling it, the pipe and return pipe and bends and the furnace and flues leading to the chimney, arranged and adapted to operate substantially in the manner specified.

In testimony whereof we have hereunto set our hands in the presence of two subscribing witnesses.

O. A. STEVENS.
EDMUND L. DU BARRY.

Witnesses:
JAMES L. NORRIS,
JAMES A. RUTHERFORD.